Figure 1:
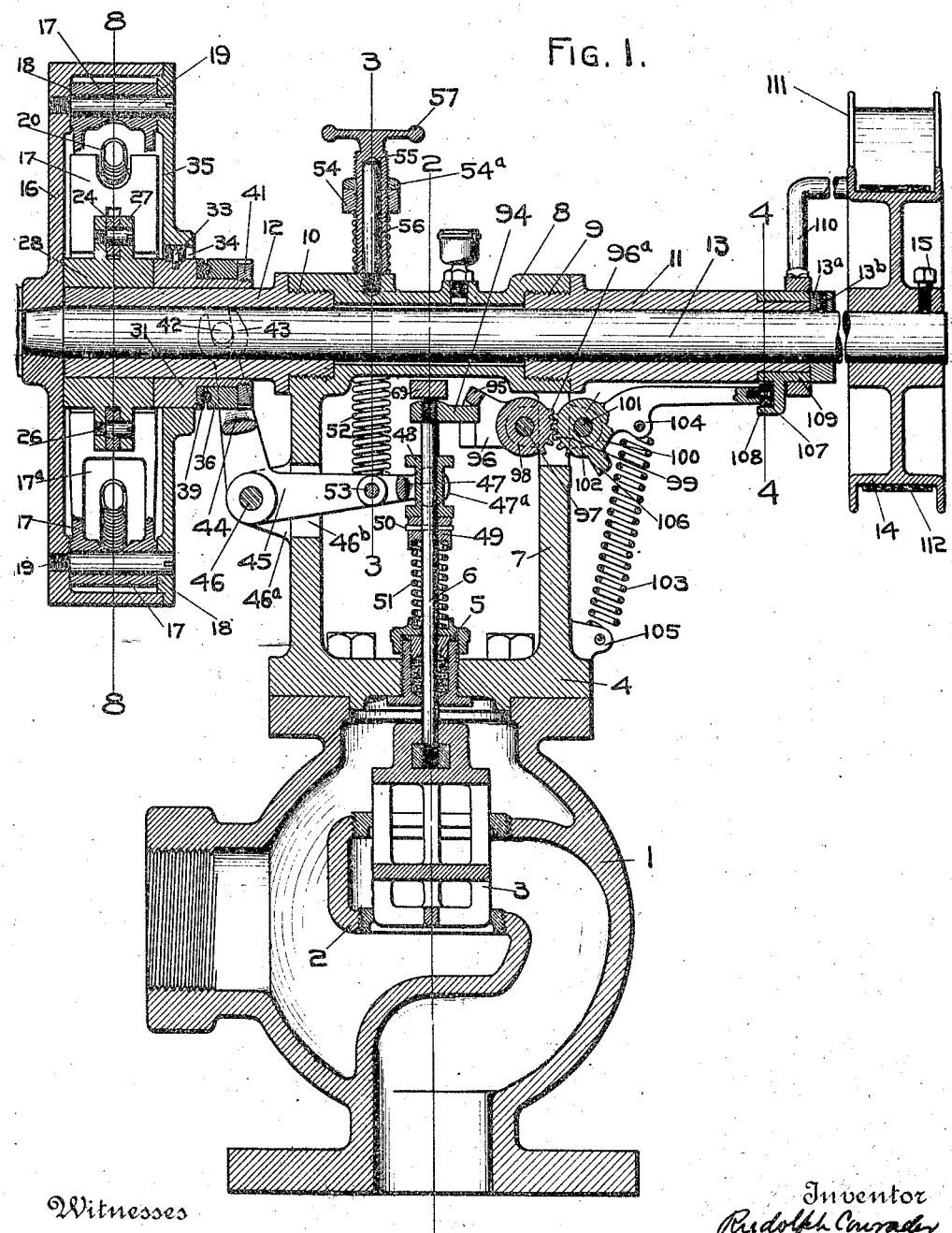

R. CONRADER.
CONTROLLING DEVICE FOR COMPRESSORS.
APPLICATION FILED OCT. 26, 1910.
1,072,576.
Patented Sept. 9, 1913.
5 SHEETS—SHEET 2.
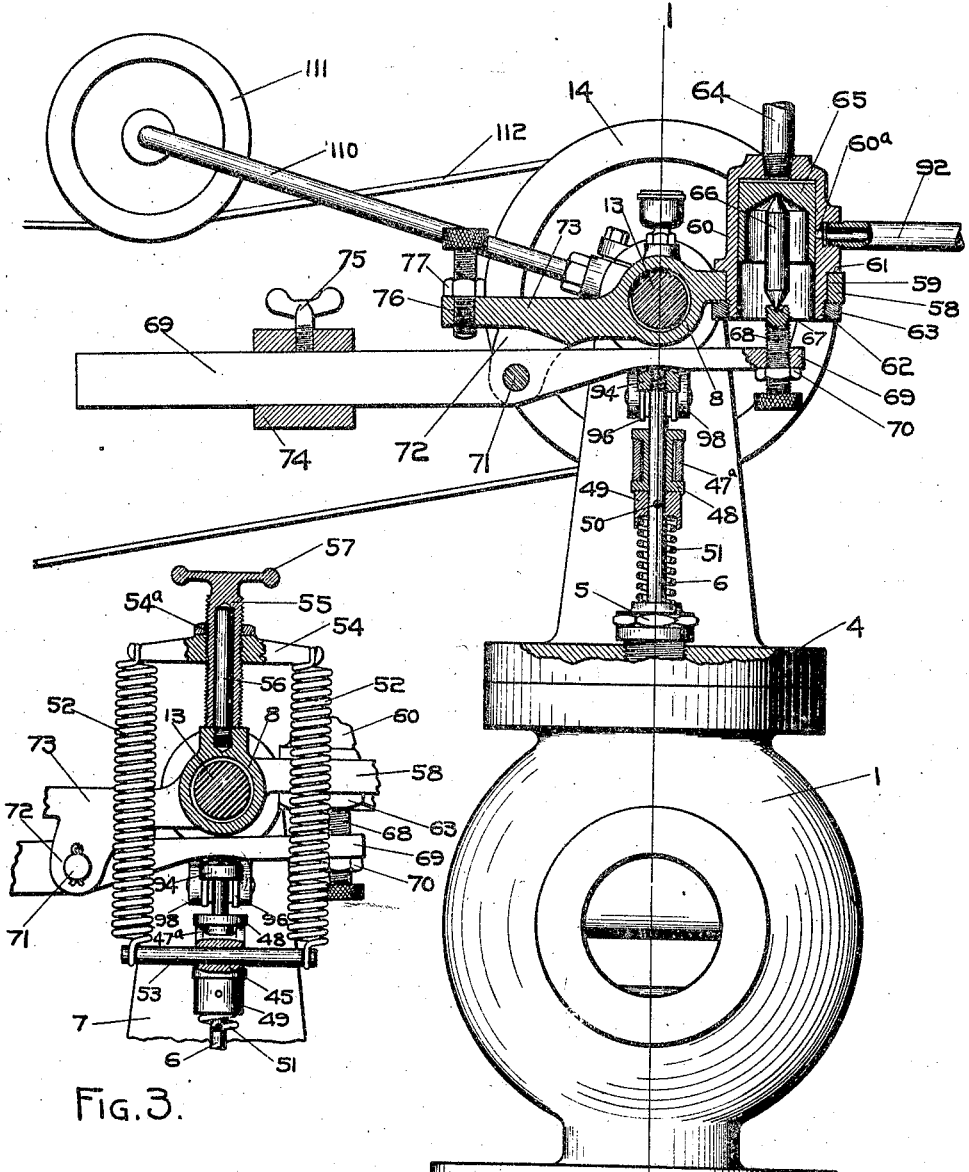
Fig. 2.
Fig. 3.
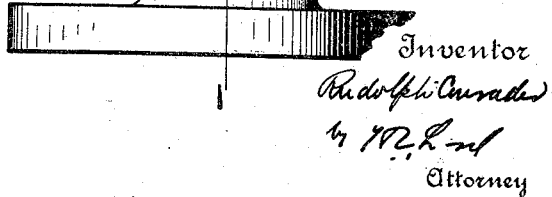

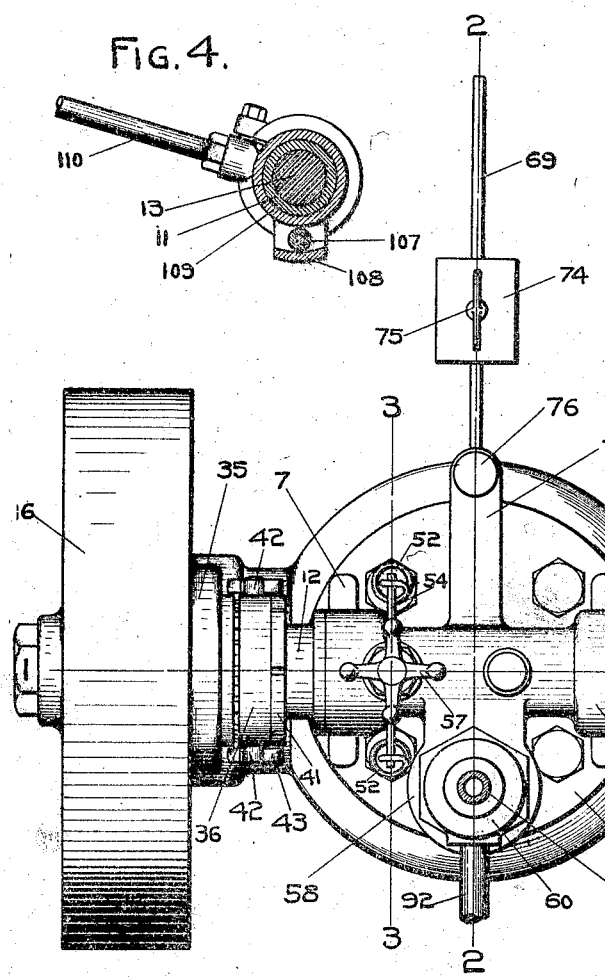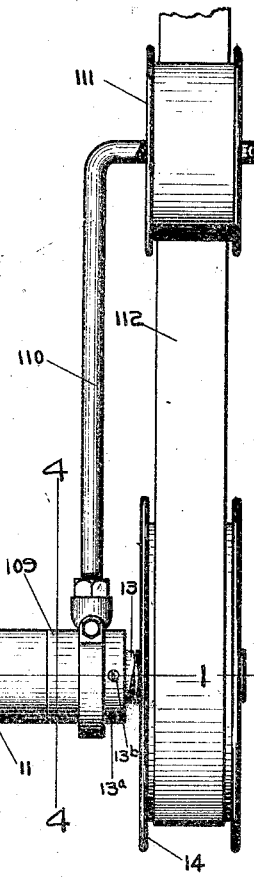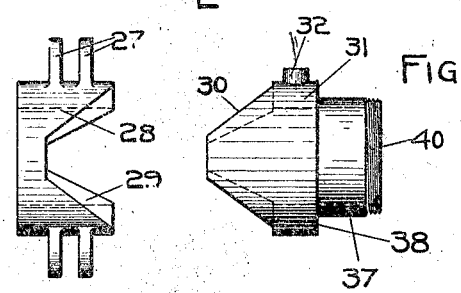

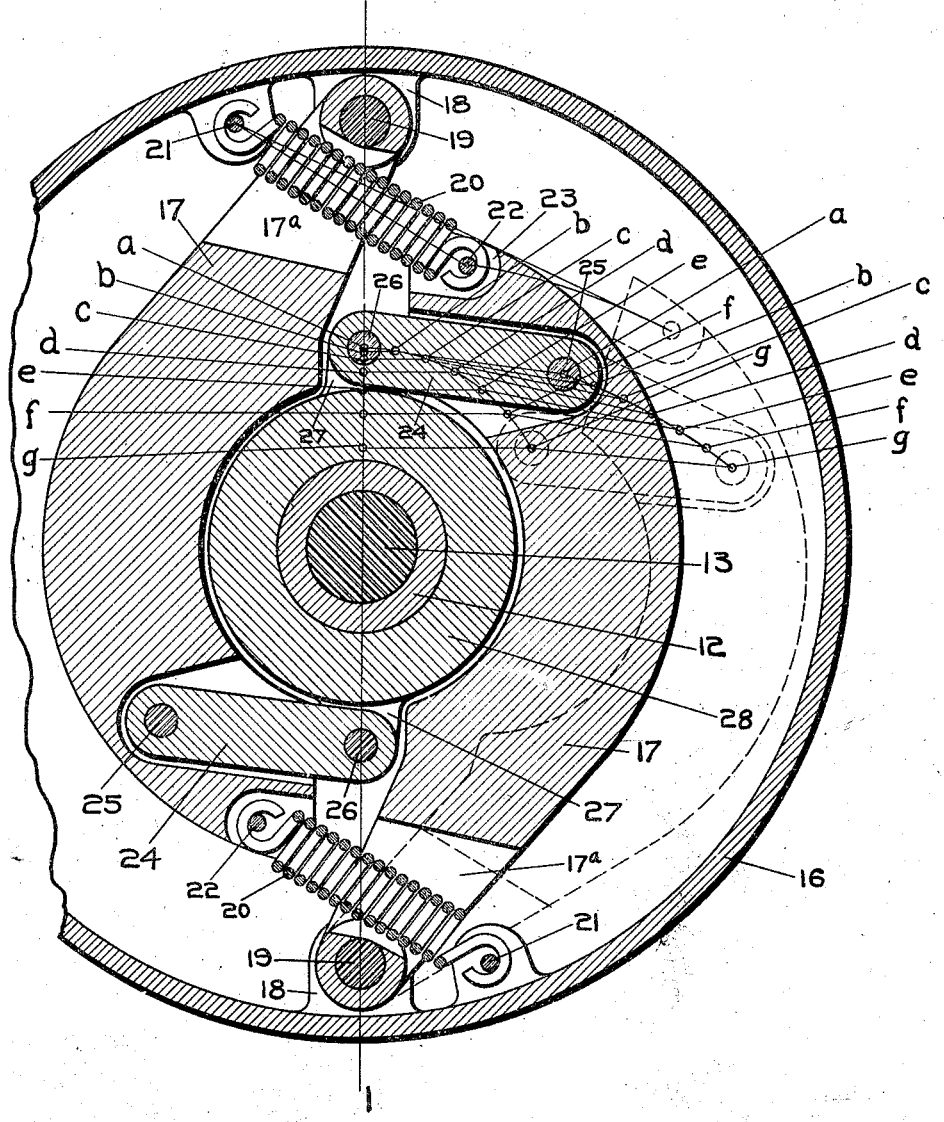

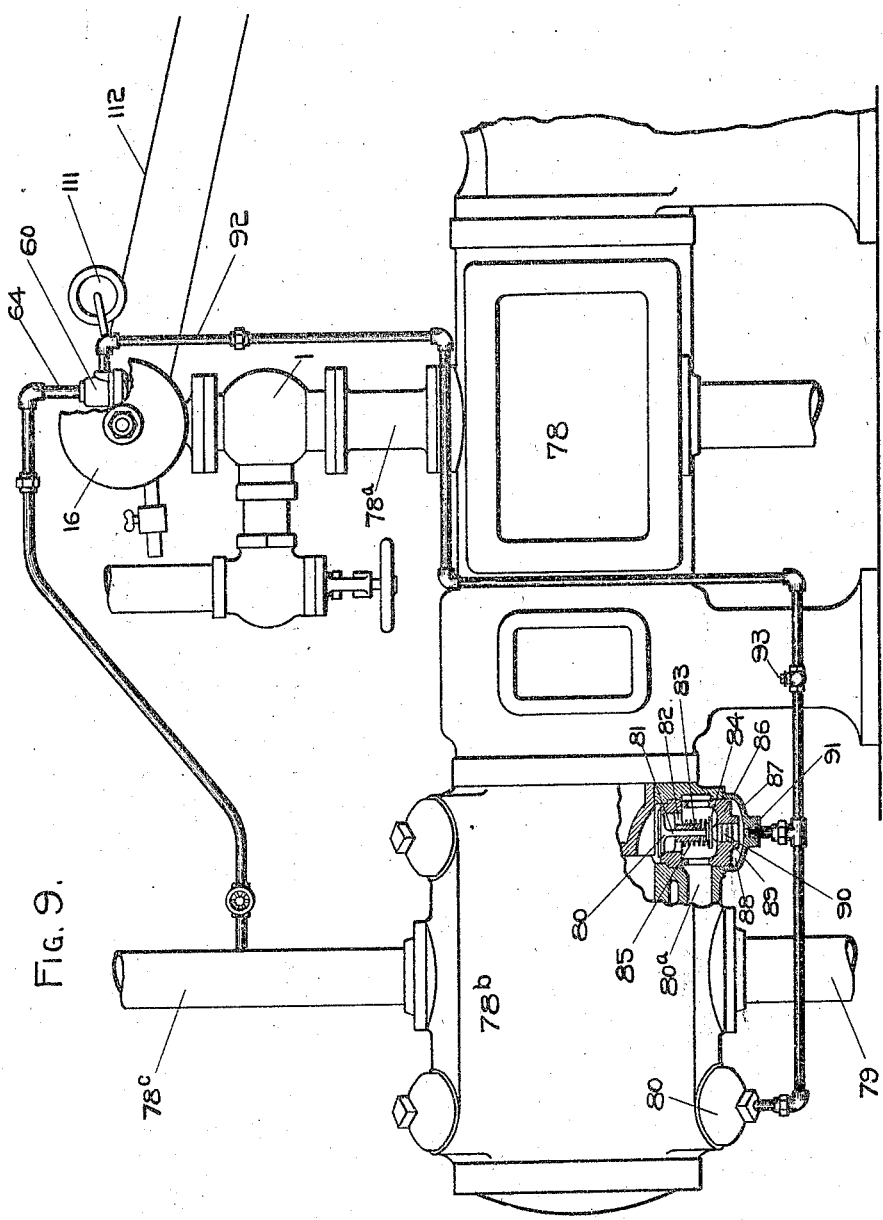

UNITED STATES PATENT OFFICE.

RUDOLPH CONRADER, OF ERIE, PENNSYLVANIA.

CONTROLLING DEVICE FOR COMPRESSORS.

1,072,576.

Specification of Letters Patent. Patented Sept. 9, 1913.

Application filed October 26, 1910. Serial No. 589,228.

*To all whom it may concern:*

Be it known that I, RUDOLPH CONRADER, a citizen of the United States, residing at Erie, in the county of Erie and State of Pennsylvania, have invented new and useful Improvements in Controlling Devices for Compressors, of which the following is a specification.

This invention relates to controlling devices for compressors, and consists in certain improvements in the construction thereof as will be hereinafter fully described and pointed out in the claims.

The invention comprises a centrifugal governor with improvements within the governor itself, and controlling mechanism operating upon the relief device of the compressor together with the pressure device acting upon the governor valve.

The invention is illustrated in the accompanying drawings as follows:

Figure 1 shows a vertical central section upon the line 1—1 in Figs. 2, 5 and 8. Fig. 2 shows a side elevation partly in section on the lines 2—2 in Figs. 1 and 5. Fig. 3 is a section on the lines 3—3 in Figs. 1 and 5. Fig. 4 is a section on the lines 4—4 in Figs. 1 and 5. Fig. 5 is a plan view of the governor. Fig. 6 is a plan view of the rotative cam sleeve for conveying the movement of the centrifugal governor. Fig. 7 is an axially moving sleeve forming a part of the same connection. Fig. 8 shows a detailed view of the centrifugal weights and their connections, the same being in section on the line 8—8 in Fig. 1. Fig. 9 is a side elevation partly in section of a compressor showing the different connections and relief device.

1 marks the governor body, 2 the diaphragm, 3 the governor valve. The governor valve is of the sliding valve type, and is opened and closed by the axial movement of the valve. A cap 4 is arranged on the valve body and has the gland 5 through which the valve stem 6 extends. Extending upwardly from the cap is the governor frame 7 having a sleeve 8 at the top. This sleeve has the screw threaded ends 9 and 10 into which the bearings 11 and 12 are screwed. The governor shaft 13 is journaled in the bearings 11 and 12. The shaft is driven by the pulley 14, the pulley being fixed on the shaft by means of the set screw 15.

The carrier 16 for the centrifugal governor is fixed on the opposite end of the shaft from the pulley 14. The governor weights 17 have their ends arranged between the ears 18 in the carrier 16, and are pivotally mounted thereon by means of the pins 19.
The centripetal springs 20 extend from the pins 21 on the carrier to the pins 22 on the ends of the weight. The ends of the weight having the slot 23 into which the springs extend, and the shanks of the weights have the openings 17ª through which the springs extend.

The governor herein described should be approximately an astatic governor varying sufficiently from this to prevent racing. The centripetal force of the springs 20 is supplemented through the connected mechanism of the governor. Links 24 are connected to the weights 17 by means of the pins 25 and by pins 26 to the ears 27 on the rotative cam sleeve 28. The cam sleeve 28 is journaled on the bearing 12, and has the cam surfaces 29 which engage the cam surface 30 on the axially moving sleeve 31 as the sleeve 28 is rotated. The cam sleeve 31 is also mounted on the bearing 12 and is locked against rotative movement relatively to the carrier by the roller 32, operating in the slot 34 in the cover plate 35 of the governor carrier 16. The roller is secured in place by the screw 33. A collar 36 is journaled on the extension 37 on the cam sleeve 31. The extension 37 is of a smaller diameter than the cam sleeve 31, forming a shoulder 38. The roller bearing 39 is interposed between the shoulder and the collar 36. The extension 37 is screw threaded at 40 and the nut 41 is arranged on this screw thread and locks the collar on the extension. Pins 42 are arranged at opposite sides of the collar 36, and the slotted ends 43 on the throat 44 of the bell crank 45 engage these pins. The bell crank lever 45 is pivoted on a pin 46, the pin being supported by the ears 46ª extending from the frame 7.
The lever extends through the perforation 46ᵇ in the frame with throated end 47, said end being provided with the circular bearing surface 47ª which engages the spool 48 on the shaft. The spool 48 rests on a collar 49 fixed on the shaft by means of the pin 50. The spring 51 is arranged between the collar 49 and the top of the gland 5, and is of sufficient strength to lift the valve when the stem is relieved from pressure from the governor or regulating devices.

The centripetal element of the governor comprises the springs 20, and also spring 52 which operate on the lever 45. The springs 52 are arranged at each side of the sleeve 8, and are secured to the lever 45 by means of the pin 53. The upper ends of the springs are secured to the yoke 54. A hollow screw 55 extends through the center of the yoke, and is mounted on a pin 56 extending upwardly from the sleeve 8. This screw is provided with a handle 57 by turning which the tension of the spring 52 may be varied. The screw is locked in adjustment by the jam nut 54$^a$. As before stated, this governor is to be arranged to operate approximately as an astatic governor, and the links 24 are arranged with relation to the weights and the rotative sleeve so that the leverage through the links will increase as the weights move outwardly so as to compensate for the greater force of the weights in their outer positions. The different positions of the pins 26 is indicated by a series of points $a$, $b$, $c$, $d$, $e$, $f$, $g$, and these points being connected with points similarly lettered indicating corresponding positions of the pin 25. These different positions are carried down to the radial line and the intersection of the radial line is marked with similar letters, thus indicating the various increase in leverage as the weights move outwardly. Through this link connection operating on the spring 52 and in connection with the springs 20, a centripetal element is provided giving approximately the astatic condition to the governor, the relative strength of the springs 20 and 52 being varied more fully accomplish this purpose.

The pressure device is carried by a bracket 58 extending from the sleeve 8. This bracket has the perforation 59 into which the end of the inverted cylinder 60 extends, having the shoulder 61 for supporting the cylinder. The end of the cylinder is screw threaded at 62 on which the end 63 is arranged for locking it with the bracket 58. Air from the source of supply from the compressor is connected with the pressure device through the pipe 64. As shown the pipe being connected to the discharge pipe of the compressor.

The piston 65 is arranged in the cylinder 60, and is subjected to the fluid pressure in the cylinder. A pin 66 has one end against the piston, and the opposite end of the socket 67 in an adjusting screw 68. The adjusting screw is arranged in the end of the lever 69, and is locked in adjustment by the jam nut 70.

The lever 69 is pivoted on the pin 71 secured to the ears 72 extending on the bracket 73. The bracket 73 extends from the opposite side of the sleeve 8 from the bracket 58. A weight 74 is arranged on the lever, said weight being positioned by sliding along the lever, and is locked in adjustment by the screw 75. The total movement of the lever is limited by a screw 76 extending through the bracket 73 into the path of the lever, the adjustment of said screw being fixed by the jam nut 77. The lever 69 passes over the top of the valve stem 6. When the pressure on the piston 65 exceeds a predetermined minimum it begins to force the lever downwardly and consequently to force the valve stem 6 downwardly against the tension of the spring 51, and this closes off the valve 3. With the added load an increasing tension of the spring 51 varies the movement of the piston 65 so that it moves downwardly as the pressure increases and returns to the position shown in Fig. 2 as the pressure decreases. The spool 48 is preferably slidingly mounted on the stem to permit of the free downward movement of the stem under the influence of the pressure device.

It is desirable to unload the compressor if the requirements are such that even with the minimum speed of the compressor through the action of the pressure device there is too great an amount of pumped fluid, and it is also desirable to have this controlled by one pressure device so that its operation with proper relation to the action of the pressure device may be assured. In Fig. 9 we show an elevation of the compressor, one of the inlet valves being in section showing a form of relief device connected according to my invention.

78 marks the steam cylinder, 78$^a$ a steam connection coming from the valve body 1, 78$^b$ the compressor cylinder, 78$^c$ the discharge from the compressor, 79 an intake, and 80 the inlet valves. The inlet valves 80 have the stems 81 which extend through the spider 82 and guide 83. A shoulder 84 is arranged on the end of the stem 81 and a spring 85 is tensioned between the spider 82 and the shoulder 84. The spider 82 is held in place by the follower 86 which is screwed into the compressor cylinder and this is provided with a cap 87 forming a cylinder 88. The follower has the cylindrical bore 89 into which is arranged the piston 90. The cap 87 has an opening 91 to which a pipe 92 extends. The opposite end of the pipe is connected with the side of the cylinder 60. The opening through the cylinder 60 being at 60$^a$ and in position to be uncovered by the piston 65 when it reaches a predetermined maximum position.

The operation of the apparatus is as follows: Ordinarily the engine is under the control of the centrifugal governor which tends to maintain a uniform speed. As the pressure rises above the predetermined minimum it, acting on the piston 65 actuates the lever 69, and it depresses the valve stem controlling the valve. The depression of this stem is more readily accomplished while it is still under the influence of the centrifugal governor because the spring 51 has a centripetal effect on the governor. In the initial movements, therefore, under the action of the pressure device, the centrifugal governor still has some control of the valve. As the pressure device rises, however, the pressure device closes the governor valve 3 to the point bringing the governor down to a speed that it will safely run. The minimum point at which it can force the valve is controlled by the screw 76. Just when the pressure device reaches this position, the piston 65 passes the opening 60$^a$ letting the air into the pipe 92 and this passing to the cylinders 88 operates the pistons 90, and thus lifts the inlet valves 80 off their seats so that with the continued operation of the compressor, the air simply moves from one end of the cylinder to the other past the inlet valves by way of the inlet passage 80$^a$.

The pressure at which the piston will uncover the port 60$^a$ may be varied by means of the screw 68 which will vary the initial position of the piston.

It is desirable to retard the release of the air from the cylinder 88 so that the full load of the compressor will not be thrown on abruptly. To accomplish this, I provide a minute leak 93 in the pipe 92. This leak, of course may be anywhere connected with the cylinder 88. When the pressure on the piston 65 reaches a point where the lever 69 will return the piston, the piston covers the opening 60$^a$. The air in the pipe and cylinder 88 then gradually escapes through the minute opening 93, thus allowing the inlet valves to close gradually and in the meantime the governor valve having been relieved of the pressure device and thus having effected the speeding up of the compressor so that when the load finally does go on there is sufficient momentum of the parts to carry the compressor over the centers.

While I have shown preferably in use in this connection an unloader or relief device operating upon the intake valves, it will be understood that the device is applicable to any relief device which unloads the compressor.

The type of governor herein shown lends itself to a safety stop mechanism by means of which when the governor belt is thrown off the governor valve is immediately closed. A finger 94 is fixed on the upper end of the stem 6 in the path of a lug 95 on the lever 96. The lever 96 is pivotally mounted on the pin 97 between the ears 98 on the frame 7. The lever 96 has the teeth 96$^a$ at its inner edge which mesh gear teeth 99 on the lever 100. The lever 100 is pivoted on the pin 101 extending between the ears 102. The spring 103 is secured to the perforated ear 104 and the perforated ear 105 on the frame 7 and exerts sufficient pressure to pull the lever 100 downwardly and through the gears and lever 96 to force the lug 95 downwardly carrying with it the finger 94 of the valve stem 6 thus closing the valve. A stop 106 is arranged on the lever which comes into engagement with the frame to limit its movement. The end of the lever 107 rides on a flange 108 on the sleeve 109. The sleeve 109 is journaled on the bearing 11. An arm 110 extends outwardly over the sleeve 109 and carries a rider pulley 111 which normally rides on the governor driving belt 112. When the belt 112 breaks, the rider pulley 111 drops and moves the flange 108 from under the end of the lever 100 thus allowing the lever 100 to drop, and in consequence closes the valve as above described.

The governor shaft 13 is locked against endwise movement at one end by the carrier 16 abutting against the end of the bearing 12, and at the opposite end of the collar 13$^a$ abutting against the bearing 11, the collar 13$^a$ being fixed on the shaft by a set screw 13$^b$.

What I claim as new is:

1. In a controlling device for compressors, the combination of a speed controlling device, controlling the motive fluid; a relief device for the compressor; a fluid actuated controlling motor acting on said controlling device; a fluid actuated relief motor acting on the relief device; and means actuated by the controlling motor for controlling the relief motor.

2. In a controlling device for compressors, the combination of a speed controlling device controlling the flow of motive fluid; a valve for the compressor; a relief device for acting on the valve of the compressor; a fluid actuated controlling motor acting on said controlling device; a fluid actuated relief motor acting on the relief device; and means actuated by the controlling motor for controlling the relief motor.

3. In a controlling device for compressors, the combination of a speed controlling device controlling the flow of motive fluid; a relief device for acting on the intake of the compressor; a fluid actuated controlling motor acting on said controlling device; a fluid actuated relief motor acting on the relief device; and means actuated by the controlling motor for controlling the relief motor.

4. In a controlling device for compressors, the combination of a valve controlling the flow of motive fluid; a centrifugal governor acting on the valve; a controlling motor acting on the valve; a relief device for the compressors; a relief motor for actuating the relief device; and means actuated by the controlling motor for controlling the relief motor.

5. In a controlling device for compressors, the combination of a valve controlling the flow of motive fluid; a centrifugal governor acting on the valve; a controlling motor acting on the valve independent of the centrifugal governor; a relief device for the compressors; a relief motor for actuating the relief device; and means actuated by the controlling motor for controlling the relief motor.

6. In a controlling device for compressors, the combination of a speed controlling device controlling the motive fluid; a relief device for the compressor; a fluid actuated controlling motor acting on said controlling device; a fluid actuated relief motor acting on the relief device; means actuated by the controlling motor for controlling the relief motor, said relief motor having a retarded release for motive fluid for retarding the action of the relief device until after the controlling motor has actuated the speed controlling device to increase the speed of the compressor.

7. In a controlling device for compressors, the combination of a speed controlling device; a controlling motor acting on said speed controlling device, comprising a cylinder and piston; a relief device for the compressor; a relief motor for actuating the relief device; and a connection between the cylinder and the relief motor, said connection being opened and closed by the movement of the piston.

8. In a controlling device for compressors, the combination of a speed controlling device; a controlling motor acting on said speed controlling device, comprising a cylinder piston; a relief device for the compressor; a relief motor for actuating the relief device; a connection between the cylinder and the relief motor, said connection being opened and closed by the movement of the piston, said relief motor having a retarded release for motive fluid.

9. In a controlling device for compressors, the combination of a speed controlling device; a controlling motor comprising a cylinder and piston; a connection between the controlling motor and the speed controlling device; means for adjusting said connection to vary the travel of the piston; a relief device for the compressor; a relief motor for said relief device; a connection between the relief motor and the cylinder, the travel of the piston controlling said connection and the adjustment of the piston varying the point at which connection is opened and closed.

10. In a controlling device for compressors, the combination of a speed controlling device; a controlling motor comprising a cylinder; a piston in the cylinder; and a connection between the piston and the speed controlling device; a relief device and relief motor for actuating the relief device; and a connection between the relief motor and the cylinder, said connection opening in the cylinder, said opening being uncovered and closed by the movement of the piston.

11. In a controlling device for compressors, the combination of a speed controlling device; a controlling motor comprising a cylinder; a piston in the cylinder; a connection between the piston and the speed controlling device; a relief device; a relief motor for actuating the relief device; a connection between the relief motor and the cylinder, said connection opening in the cylinder, said opening being uncovered and closed by the movement of the piston; and means for adjusting the position of the piston to vary the point in its travel when the opening is uncovered.

12. In a controlling device for compressors, the combination of a valve; a centrifugal governor actuating the valve; a controlling motor; a connection between the controlling motor and the valve; a relief device; a relief motor for the relief device; and means controlled by the controlling motor for controlling the relief motor.

13. In a controlling device for compressors, the combination of a valve; a centrifugal governor acting on the valve, comprising the centrifugal and centripetal elements of the governor; a controlling motor; a connection between the controlling motor and the valve independent of the centrifugal governor elements; a relief device; a relief motor for the relief device; and means controlled by the controlling motor for controlling the relief motor.

14. In a controlling device for compressors, the combination of a speed controlling device; a fluid actuated controlling motor actuating the speed controlling device; a relief device for the compressor; a relief motor acting on the relief device; and means controlled by the controlling motor for actuating the relief motor only at a desired minimum pressure of pumped fluid on the controlling motor.

15. In a controlling device for compressors, the combination of a speed controlling device; a fluid actuated controlling motor actuating said speed controlling device; a relief device for the compressor; a fluid actuated relief motor for actuating the relief device; and a connection between the relief motor and the controlling motor, said connection being opened to actuate the relief motor only when the controlling motor actuates the speed controlling device to effect a desired minimum speed of a compressor controlled by the speed controlling device.

16. In a controlling device for compressors, the combination of a speed controlling device; a fluid actuated controlling motor actuating said speed controlling device; a relief device for the compressor; a fluid actuated relief motor for actuating the relief device; a connection between the relief motor and the controlling motor, said connection being opened to actuate the relief motor only when the controlling motor actuates the speed controlling device to effect a desired minimum speed of a compressor controlled by the speed controlling device; and means for adjusting the controlling motor to vary the minimum speed of a compressor controlled by the speed controlling device.

In testimony whereof I have hereunto set my hand in the presence of two subscribing witnesses.

RUDOLPH CONRADER.

Witnesses:
 BLANCHE HARTMAN,
 C. D. HIGBY.